UNITED STATES PATENT OFFICE.

ROLAND L. ANDREAU, OF WILMINGTON, DELAWARE, ASSIGNOR TO E. I. DU PONT DE NEMOURS AND COMPANY, OF WILMINGTON, DELAWARE, A CORPORATION OF DELAWARE.

PROCESS OF MAKING ACETYL ISOBORNEOL.

1,420,399.  Specification of Letters Patent.  Patented June 20, 1922.

No Drawing.  Application filed July 7, 1917. Serial No. 179,128.

*To all whom it may concern:*

Be it known that I, ROLAND L. ANDREAU, of Wilmington, in the county of New Castle, and in the State of Delaware, have invented a certain new and useful Improvement in Processes of Making Acetyl Isoborneol, and do hereby declare that the following is a full, clear, and exact description thereof.

My invention relates particularly to the process for producing acetyl iso-borneol, especially for use in the commercial production of synthetic camphor, but has application to other uses including the production of other acetyl oxy-dihydro-terpenes.

The object of my invention is to provide a process of making acetyl iso-borneol and other acetyl oxy-dihydro-terpenes in an advantageous manner and in which, when glacial acetic acid is used, the most of the said acetic acid is recovered in a suitable strength, so that it may be used over continuously without any great loss thereof.

A further object is to maintain the strength of the glacial acetic acid so that it may be used repeatedly with the same degree of effectiveness. Hitherto acetyl iso-borneol has been prepared by treating camphene with glacial acetic acid and 50% strength sulphuric acid, after which the mixture was drowned in water. When the process is carried out in that manner, the acetic acid becomes diluted to a point where it cannot be used again without regeneration. Even distillation in vacuo to recover the acetic acid, would not result in the recovery of any large part of the acid in concentrated form. Furthermore, when it was desired to recover the acetic acid by distillation, the sulphuric acid present remaining after distillation tended to decompose the substances present, thus lowering the quality and yield of the product of the process. The object of my invention is to avoid these disadvantages.

In general my process may be carried out by treating camphene with the glacial acetic acid and concentrated sulphuric acid, and then before distilling off under reduced pressure the excess acetic acid, adding a neutralizing agent, for example, a neutral anhydrous acetate which is acted upon by the sulphuric acid to produce free glacial acetic acid and a neutral sulphate which latter does not affect the other substances present. In this way the greater portion of the acetic acid may be obtained at a strength suitable for further use in the process.

For example I may proceed as follows:

I introduce 100 kilograms of glacial acetic acid, of 97–99% strength into a still and then add slowly thereto 1,500 grams of concentrated sulphuric acid, 95% $H_2SO_4$, so that it becomes thoroughly dissolved by stirring. I then add 40 kilograms of camphene and the entire mass is stirred and heated from about 55° to 66° C. for three hours, thus completing the reaction. 2.5 kilograms of anhydrous sodium acetate are then added at once, and the mass stirred very thoroughly. The excess acetic acid is distilled over, under reduced pressure, thus recovering the greater portion thereof at a strength suitable for further use in the process, until only acetyl iso-borneol and neutral sodium sulphate remain in the still. When the acetic acid used at the start has a strength of 97% the recovered acetic acid which is suitable for use in the next operation has a strength of 96%. The sodium sulphate is either filtered off or washed out with water and the acetyl iso-borneol remains. Instead of using acetic acid, I may, if desired, use formic acid, propionic acid, etc. Instead of using the concentrated sulphuric acid it is also possible to use some other mineral acid such as phosphoric acid.

While I have described my invention above in detail I wish it to be understood that many changes may be made therein without departing from the spirit thereof. For example, the proportions and temperatures may be varied to a considerable degree. It is also to be understood that other terpenes may be treated in a similar manner.

What I claim is:

The process of making acetyl-isoborneol which comprises heating camphene with acetic acid in the presence of concentrated sulfuric acid at a temperature of from about 55° to 66° C, until the reaction is substantially completed, neutralizing the sulfuric acid with substantially anhydrous sodium acetate, distilling off the resulting acetic acid under reduced pressure, and then removing from the residue the sodium sulphate formed by the neutralization.

In testimony that I claim the foregoing I have hereunto set my hand.

ROLAND L. ANDREAU.

Witnesses:
CHAS. E. WEBB, Jr.,
FRANK G. CARPENTER.